United States Patent
Wang

(10) Patent No.: US 9,491,936 B2
(45) Date of Patent: Nov. 15, 2016

(54) CREATION METHOD OF A FISHHOOK WITH ATTRACTANT

(71) Applicant: Feizhou Wang, Tianjin (CN)

(72) Inventor: Feizhou Wang, Tianjin (CN)

(*) Notice: Subject to any disclaimer, the term of this patent is extended or adjusted under 35 U.S.C. 154(b) by 99 days.

(21) Appl. No.: 14/558,739

(22) Filed: Dec. 3, 2014

(65) Prior Publication Data

US 2015/0359209 A1     Dec. 17, 2015

(30) Foreign Application Priority Data

Jun. 11, 2014 (CN) .......................... 2014 1 0255219

(51) Int. Cl.
*A01K 83/00* (2006.01)
*A01K 85/01* (2006.01)
*B21F 45/12* (2006.01)

(52) U.S. Cl.
CPC ............... *A01K 85/01* (2013.01); *A01K 83/00* (2013.01); *B21F 45/12* (2013.01)

(58) Field of Classification Search
CPC ................................ A01K 83/00; B21F 45/12
See application file for complete search history.

(56) References Cited

U.S. PATENT DOCUMENTS

| 2,849,346 | A | * | 8/1958 | Almen | .................... B32B 15/08 |
| | | | | | 156/278 |
| 4,927,643 | A | * | 5/1990 | D'Orazio | ............... A23K 1/188 |
| | | | | | 426/1 |
| 2006/0269513 | A1 | * | 11/2006 | Dodd | ................... A01K 97/045 |
| | | | | | 424/84 |

* cited by examiner

*Primary Examiner* — Nathan Empie
(74) *Attorney, Agent, or Firm* — Wayne & King LLC

(57) ABSTRACT

The method for manufacturing a fishhook with as fish attractant comprises the following steps: (1) pouring the attractant and clad material into ethanol, then stirring them uniform to form suspension, wherein solid content of the suspension is controlled between 10% and 50%; (2) making the suspension stick to the surface of the fishhook by spraying or soaking, then evaporating the solvent by blowing hot wind so that the attractant acting as solute is coagulated on the surface of the fishhook, covers the whole fishhook. When using the fishhook of the present invention for fishing, there is no need to bring your own bait. The fishhook can be directly put into water, and the attractant enveloping the fishhook will send out scent and attract fish school in water. The combination of fishing bait and fishhook as an organic whole cannot only improve fishing rate but also be easier to carry.

2 Claims, No Drawings

CREATION METHOD OF A FISHHOOK WITH ATTRACTANT

CROSS-REFERENCE TO RELATED APPLICATIONS

This application is a continuation of, and claims priority to Chinese Patent Application No. 201410255219.6 with a filing date of Jun. 11, 2014. The content of the aforementioned application, including any intervening amendments thereto, is incorporated herein by reference.

BACKGROUND OF THE INVENTION

This invention refers to fishing equipment, describing a creation method of a fishhook with attractant.

At present, there is a lure hook for fishing in market, which is to hide fishhook inside artificial fish or shrimp, hazing fish and improving successful fishing rate. Although acting as bait, artificial fish or shrimp does not directly emit scent to attract fish school. And when attacking artificial fish or shrimp, fish may throw fishhook away, which will affect fishing rate.

This invention is aimed to provide a fishhook with attractant and high fishing rate, solving, problems mentioned in the above background technology.

SUMMARY OF THE INVENTION

For realizing the above-mentioned purpose, this invention provides the following technical schemes.

The method for manufacturing a fishhook with a fish attractant comprises the following steps: (1) pouring the fish attractant and clad material into ethanol, and then stirring them uniformly to form suspension, wherein the solid content of the suspension is controlled between 10% and 50%; (2) making the suspension stick to the surface of the fishhook, and then evaporating the solvent (i.e. the ethanol) of the suspension by blowing hot wind so that the fish attractant acting as the solute of the suspension is coagulated on the surface of fishhook and covers the whole, fishhook. The clad material comprises ethyl cellulose, plasticizer, surface active agent and acrylic resin; and a weight proportion of the ethyl cellulose, plasticizer, surface active anent and acrylic resin is 50-70: 20-40:1-5: 20-50.

In the present invention, the term "hot wind" refers to the wind with a temperature above room temperature.

In the present invention, the term "attractant" or "fish attractant" refers to a material that would attract fish and is usually used for fishing.

As a further scheme of this invention, the mentioned attractant includes the following ingredient with weight proportion: plant perfume 0.01-0.5, synthetic essence 0.01-0.5, fishy smell agent 0.5-3, compound amino acid 20-40, vitamin B compound B30-40, pigment 0.5-2, DMPT (Sulfobetaine/Dimethylthetin) 1-5 and APM (Aspartame) 1-5.

In the present invention the term "fishy smell agent" refers to a material smelling or tasting like fish.

Compared with previous techniques, this invention owns the following advantages.

When using the fishhook of the present invention for fishing, there is no need to bring your own bait. The fishhook can directly put into water, and the attractant enveloping the fishhook will send out scent and attract fish school in water. The combination of fishing bait and fishhook as an organic cannot only improve success rate of fishing but also be easier to carry.

DETAILED DESCRIPTION OF PREFERRED EMBODIMENT

Now, in combination with embodiments of this invention, the technical schemes of invention will be described clearly and completely. Obviously, the mentioned embodiments are only some embodiments of this invention instead of all embodiments of this invention. Based on the embodiments of this invention, one of ordinary skill in the art will obtain other embodiments which are all belong to the protection scope of this invention, without paying creative work.

A method for manufacturing a fishhook with a fish attractant comprises the following steps: firstly, pouring plant perfume, synthetic essence, fishy smell agent, compound amino acid, vitamin B compound, pigment, DMPT, APM and clad, materials into ethanol proportionally, and stirring them uniformly to form suspension, wherein the solid content of the suspension is controlled between 10% and 50%; secondly, through directly spraying the suspension on the surface of the fishhook or directly soaking the fishhook in the suspension, making the suspension stick to the surface of the fishhook, and then evaporating the ethanol by blowing hot wind. The fish attractant is hence solidified on the surface of the fishhook, forming a cladding layer, and then a fishhook with a fish attractant is made. The attractant enveloping the fishhook will send out scent and attract fish school in water. The combination of fishing bait and fishhook as an organic whole cannot only improve fishing rate but also be easier to carry.

Obviously, this invention is not limited to the details of the above-mentioned demonstrative illustrative embodiments for one of ordinary skill in the art.

The present invention can be implemented in other forms without deviating from the spirit and essential features of this invention. Therefore no matter what point it is seen from the above described embodiments are illustrative and are non-restrictive. The scope of this invention is defined upon claims instead of the above-mentioned description. Thus, it aims at this invention including all changes within implication and scope of equal conditions for claims.

In addition, it should be understood that, although this specification describes in accordance with specific embodiments, not every embodiment only includes an independent technical scheme. Choosing specification as the narration mode to describe does is not only for the purpose of clearness. One of ordinary skill in the art should regard the specification as a whole, and think that technical schemes in embodiments also can be combined properly to form other embodiments which can be understood by one of ordinary skill in the art.

I claim:

1. A method for manufacturing a fishhook with a fish attractant, including the following steps:
   (1) pouring the fish attractant and clad material into ethanol, and then stirring them uniformly to form suspension, wherein solid content of the suspension is controlled between 10% and 50%; and
   (2) making the suspension stick to a surface of the fishhook by spraying or soaking, and then evaporating a solvent of the suspension by blowing hot wind with a temperature above room temperature so that the fish attractant acting as a solute of the suspension is coagulated on the surface of the fishhook, covers the whole fishhook, and forms an attractant cladding layer;
   wherein the clad material comprises ethyl cellulose, plasticizer, surface active agent and acrylic resin; a weight proportion of the cellulose, plasticizer, surface active agent and acrylic resin is 50-70: 20-40:1-5: 20-50.

2. The method for manufacturing the fishhook with the fish attractant according to claim 1, wherein the fish attractant includes the following ingredients with weight proportion: plant perfume 0.01-0.5, synthetic essence 0.01-0.5, fishy smell agent 0.5-3, compound amino acid 20-40, vitamin B compound 30-40, pigment 0.5-2, DMPT (Sulfobetaine/Dimethylthetin) 1-5, APM (Aspartame) 1-5.

* * * * *